3,544,628
UREA SYNTHESIS
Henry Hsu, New Rochelle, N.Y., assignor to Pullman Incorporated, Chicago, Ill., a corporation of Delaware
Continuation of application Ser. No. 222,572, Sept. 10, 1962. This application Sept. 20, 1965, Ser. No. 496,224
Int. Cl. C07c *127/00*
U.S. Cl. 260—555          9 Claims

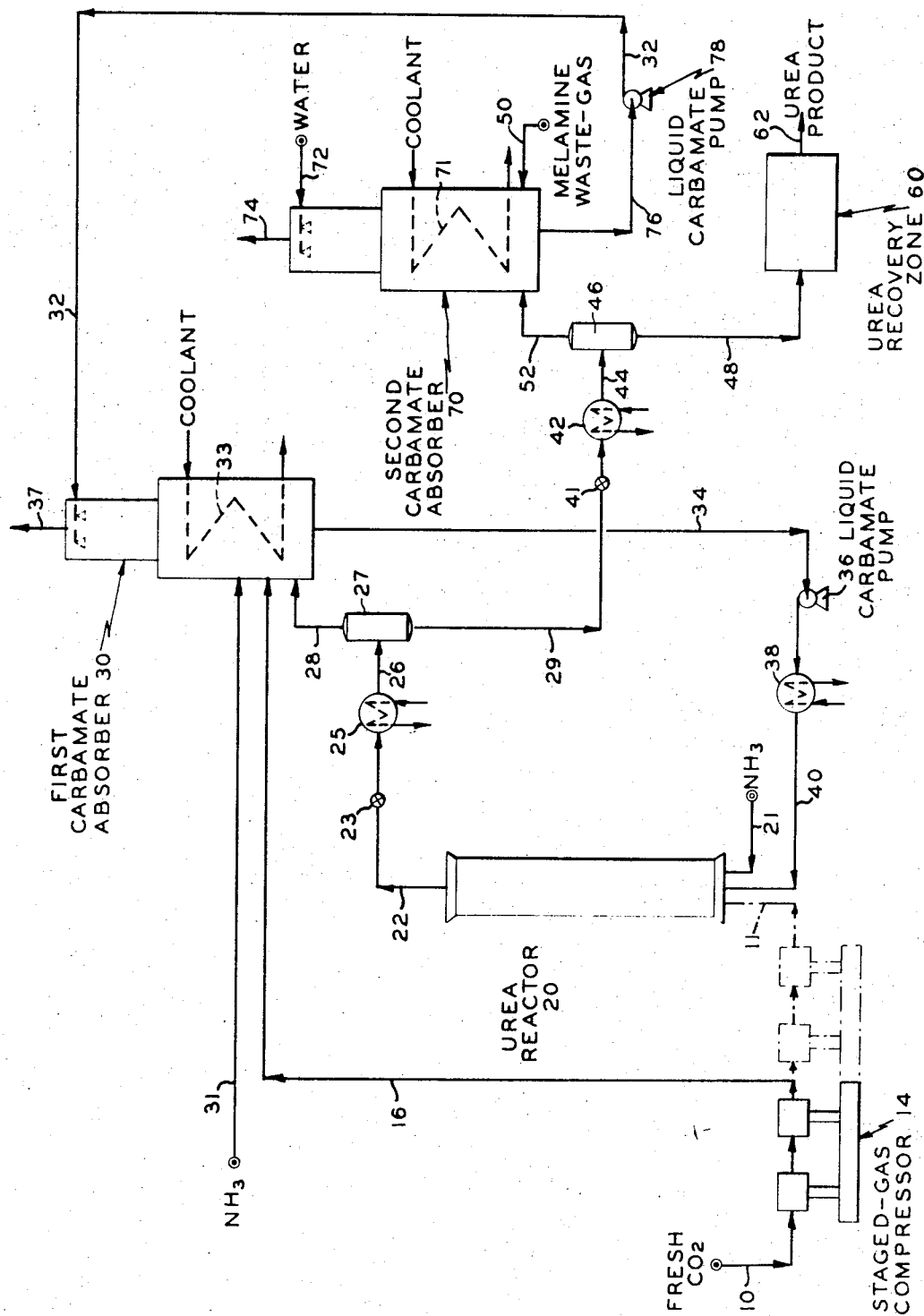

ABSTRACT OF THE DISCLOSURE

Urea is produced by reacting liquid ammonium carbonate under exothermic conditions.

---

This application is a continuation of application Ser. No. 222,572, filed Sept. 10, 1962, now abandoned.

The present invention relates to the production of urea. In one aspect, it relates to multipressure stage urea synthesis from ammonia and carbon dioxide reactants. In another aspect, it relates to the efficient utilization of waste-gas streams which contain a mixture of ammonia and carbon dioxide, and more particularly, in this aspect, it relates to utilizing an ammonia and carbon dioxide waste-gas mixture derived from a melamine synthesis.

Melamine is generally produced by subjecting urea to an elevated pressure and temperature. By reason of a partial decomposition, a mixture containing ammonia and carbon dioxide is withdrawn as waste-gas from the melamine process. In order for the production of melamine to remain economically feasible, the byproduct mixture of ammonia and carbon dioxide must be recovered and reused in a complete and efficient manner.

It has been suggested that the gaseous mixture of ammonia and carbon dioxide withdrawn from the melamine reaction be utilized as feed to a urea production unit operated in close cooperation with a melamine process. In order to achieve this end, however, employing a standard urea synthesis under an elevated pressure, it is necessary to separate and individually purify the ammonia and carbon dioxide constituents of the mixture, since such mixture cannot be compressed without causing condensation. Unfortunately, such separations and purifications as are necessary are achieved only at such considerable expense that the recovery of melamine waste-gas constituents for use in standard urea processes is not attractive from an economic standpoint.

It is, therefore, an object of the present invention to overcome and eliminate the aforementioned difficulties experienced in the past and to provide an attractive method for the recovery of waste-gas mixtures of ammonia and carbon dioxide.

Another object of the present invention is to provide a method of recovering the ammonia and carbon dioxide values contained in a waste-gas mixture derived from a high pressure and temperature melamine synthesis, or like values contained in waste mixtures of the same from other sources.

Another object is to provide a useful urea synthesis.

A further object of the present invention is to provide an efficient staged-pressure synthesis of urea from ammonia and carbon dioxide.

Other objects and advantages of the present invention will become apparent to those skilled in the art from the following description and disclosure.

The above objects are generally accomplished in accordance with the present invention by carrying out a urea synthesis from ammonia and carbon dioxide in a plurality of pressure stages. Accordingly, fresh feed comprising carbon dioxide is reacted with ammonia under a pressure to produce ammonium carbamate, and the ammonium carbonate is subjected to an elevated pressure to produce urea.

In one aspect, the carbon dioxide, introduced at least in part as fresh feed, is reacted with ammonia to produce ammonium carbamate in a first reaction zone, which is maintained generally under a carbamate-forming pressure, preferably, between about 0 p.s.i.g. and about 1000 p.s.i.g., and most preferably, between about 150 p.s.i.g. and about 350 p.s.i.g. Ammonium carbamate formed in the reaction is passed to a second reaction zone maintained under an elevated pressure, preferably, between about 1700 p.s.i.g. and about 3500 p.s.i.g., and most preferably, between about 2400 p.s.i.g. and about 2900 p.s.i.g., to produce urea.

In the aforementioned first reaction zone, a temperature is maintained in correspondence with a pressure such that ammonium carbamate forms from ammonia and carbon dioxide. Preferably, a temperature is maintained between about 60° F. and about 300° F. and, most preferably, between about 160° F. and about 220° F.; and in the second reaction zone, preferably, between about 240° F. and about 450° F. and, most preferably, between about 340° F. and about 400° F.

In one embodiment of the present invention, ammonia and carbon dioxide, at least a portion of which is introduced as fresh feed, are reacted in a first reaction zone under a pressure and temperature in the presence of a controlled amount of water to maintain ammonium carbamate formed from the reaction in the liquid phase. The liquid phase withdrawn from the first reaction zone is then pressurized and introduced to a second reaction zone to convert the ammonium carbamate to urea.

From the above statement of the invention, it is apparent that a substantial advantage accrues in the operation of the present invention by reason of reduced energy requirements. Energy which was required in prior urea processes to compress gaseous carbon dioxide to elevated pressures employed in such prior processes is substantially conserved by initially feeding carbon dioxide or mixtures containing the same to a low pressure stage in accordance with the present invention. Ammonium carbamate produced at the low pressure level is then pressurized by suitable means such as pumping means at considerably less expense than compressing gaseous carbon dioxide.

In respect to the amount of water which is employed to maintain ammonium carbamate substantially in the liquid phase while operating in the aforementioned range of pressure and temperature in the first reaction zone, the ammonia and carbon dioxide are reacted in the presence of a water to carbon dioxide mol ratio of at least about 0.1:1 and, preferably, between about 0.5:1 and about 1.8:1. Operating within the preferred range of water to carbon dioxide ratios ammonium carbamate is effectively maintained in the liquid phase while subsequent conversion of the carbamate to urea in a second reaction zone is not substantially affected.

In one aspect of the present invention, the source of ammonia and carbon dioxide reacted in the aforementioned first reaction zone is immaterial, as long as at least a portion of the ammonia and carbon dioxide is introduced as fresh feed, the remaining ammonia and carbon dioxide in the same zone being derived from other sources such as a recycle stream.

In another aspect, however, the present invention provides an attractive method of recovering waste-gas containing mixtures of ammonia and carbon dioxide and like mixtures. Such unseparated mixtures cannot be compressed because of condensation and, therefore, cannot be introduced to a urea autoclave as feed in a standard urea synthesis. Nevertheless, unseparated mixtures of the aforementioned gases derived from any extrinsic source can be successfully treated in the stage-pressure process of the present invention to economically produce urea therefrom.

The present invention is especially useful in the recovery of a waste-gas mixture containing ammonia and carbon dioxide, and mixtures additionally containing water derived from a process producing melamine from urea. By the method of the present invention, the necessity for separating, separately purifying and compressing the separated reactant is averted and the energy and the material necessarily consumed thereby is advantageously conserved.

In the operation of the present invention, sufficient ammonia is maintained in the first reaction zone to condense substantially all of the carbon dioxide. An ammonia to carbon dioxide ratio is maintained in the first reaction zone, preferably between about 2:1 and about 15:1 and, most preferably, between about 4:1 and about 6:1, and in the second reaction zone in which urea is produced broadly between about 2:1 and about 15:1.

In one embodiment of the process of the present invention wherein the reaction of ammonia and carbon dioxide is carried out in two pressure stages, ammonium carbamate being produced in a first low pressure stage and urea being produced in a second stage under an elevated pressure, the synthesis is further improved by splitting the fresh feed to the synthesis in such a manner that at least a portion of the fresh feed is introduced to the second reaction zone and another portion to the first reaction zone.

When all of the fresh feed is introduced to the first reaction zone, it is difficult to maintain the reaction temperature in the second urea reaction zone without introducing heat from an extrinsic source. In order to overcome this difficulty and in order to further conserve energy, the aforementioned split in the fresh feed is effected such that preferably between about 10 and about 90 mol percent of the fresh carbon dioxide feed is introduced to the second reaction zone and the remaining portion of the carbon dioxide feed is introduced to the first reaction zone. Preferably, between about 50 and about 70 mol percent of the fresh carbon dioxide feed is introduced to the second reaction zone and the remaining portion of the carbon dioxide is fed to the first reaction zone.

Having described the present invention in general terms, reference is now had to the drawing which illustrates diagrammatically, in elevation, an embodiment of the process of the present invention. Alternate process schemes are illustrated by means of broken as opposed to solid lines in the drawing. As shown in the drawing, fresh carbon dioxide is introduced in line 10, pressurized as necessary to between about 0 p.s.i.g. and about 1000 p.s.i.g. in staged-gas compressor 14, and passed in line 16 to a first ammonium carbamate absorber 30. In absorber 30, carbon dioxide and ammonia are reacted in the presence of water under a suitable pressure and temperature to produce a mixture containing liquid ammonium carbamate. Unreacted gas, preferably minimized its ammonia and carbon dioxide content by means of a scrubbing solution introduced in line 32, referred to later herein, is withdrawn from the system in line 37. A mixture containing liquid ammonium carbamate is withdrawn from absorber 30 in line 34, pressurized in carbamate pump 36, raised in temperature in heater 38, and passed to urea reactor 20 in line 40.

Carbon dioxide feed to the first ammonium carbamate absorber 30 is derived at least in part from a source of fresh feed such as, for example, substantially pure carbon dioxide. Carbon dioxide is obtained about 98 percent pure from a standard purification process such as, for example, a MEA, caustic, or carbamate scrubbing process. Fresh carbon dioxide feed is, likewise, employed in the process of the present invention which feed constitutes the unseparated waste mixture containing ammonia and carbon dioxide, or ammonia, carbon dioxide, and water derived from a process producing the same such as, for example, a melamine process.

The gaseous waste from a melamine process is shown in the drawing being introduced by line 50, second ammonium carbamate absorber 70, later described herein. Such gaseous waste from a melamine or other process is also successfully introduced to this urea synthesis at any part of the first reaction zone including the first ammonium carbamate absorber 30, the first zone being, preferably, defined as that portion of the process which is maintained under a pressure between about 0 p.s.i.g. and about 1000 p.s.i.g. The preferred point of introduction to the first reaction zone depends upon the waste-gas pressure.

Another portion of the carbon dioxide present in absorber 30 in a recycle process as shown in the drawing is derived from recycle values introduced to the absorber as a gaseous mixture in line 28 as is further described in a later portion of this specification. Still another source of carbon dioxide in absorber 30 in the embodiment shown in the drawing is carbamate solution introduced in line 32 as a scrubbing solution.

In order to maintain the proper ratio of ammonia to carbon dioxide within absorber 30 such that substantially all of the carbon dioxide which enters the absorber is condensed to ammonium carbamate, ammonia must be present in sufficient quantity. As one method of providing sufficient ammonia in absorber 30, substantially pure ammonia is introduced in line 31 to absorber 30. Ammonia is also introduced in the recycle introduced in line 28 as illustrated by the drawing. As an alternate method of supplying ammonia, substantially all of the fresh ammonia is introduced to urea reactor 20 by means of line 21. By either alternate, the ammonia to carbon dioxide ratio in absorber 30 is maintained, preferably, between about 2:1 and 15:1 and, most preferably, between about 4:1 and about 6:1 in order to insure proper absorption, and also to provide a proper ammonia to carbon dioxide ratio in urea reactor 20.

The reaction of ammonia and carbon dioxide to produce ammonium carbamate is exothermic and it is necessary to remove at least a portion of the heat of reaction by suitable means, such as a coolant circulated in coil 33 in order to maintain desired conditions of temperature and pressure such that the product mixture of carbamate is maintained substantially in the liquid phase. A temperature in absorber 30 is, therefore, maintained preferably between about 60° F. and about 300° F. and, most preferably, between about 160° F. and about 220° F. For operation within this temperature range and within the aforementioned ammonia to carbon dioxide ratios, a corresponding pressure, preferably between about 150 p.s.i.g. and about 350 p.s.i.g. is maintained in absorber 30.

In order to insure condensation of ammonium carbamate in absorber 30, a controlled amount of water based on the amount of carbon dioxide which is present is maintained. Water can be introduced directly to the absorber 30, but it is preferably introduced in a dilute ammonium carbamate solution introduced in line 32 and derived from second ammonium carbamate absorber 70. As previously described, the introduction of solution in line 32 to an appropriate portion of absorber 30 assists in scrubbing remaining gaseous ammonia and carbon dioxide from residual gas vented in line 37. A water to carbon dioxide mol ratio in absorber 30 is, preferably, maintained at least about 0.1:1 and, most preferably, between about 1.8:1.

A mixture comprising liquid ammonium carbamate is withdrawn from absorber 30 in line 34 and pressurized by means of a liquid ammonium carbamate pump 36 situated in this line. A major process advantage is realized in the present invention which makes it possible to pump substantially all of the reactants in liquid form to the elevated pressures employed in the urea reaction instead of performing total gas compression of fresh carbon dioxide feed at substantially increased expense as in processes known in the prior art. Pressurized liquid is heated to a suitable temperature level in heater 38 and introduced to urea reactor 20 in line 40. In the case where all or substantially all of the fresh carbon dioxide feed is introduced to a carbamate absorber and liquid carbamate is produced therefrom, it is necessary to raise the temperature of the pressurized liquid to a suitable urea reaction temperature in heater 38 or, as an alternative, to add heat to reactor 20 by extrinsic heating means. In the first alternate, the inlet temperature in line 40 is maintained between about 10° F. and about 50° F. above the desired outlet temperature in line 22. The endothermic character of the urea reaction accounts for the necessity of the above heat addition steps.

The conditions in urea reactor 20 are maintained, generally, at an elevated pressure and temperature to produce urea. A pressure is maintained, preferably, between about 1700 p.s.i.g. and about 3500 p.s.i.g. and, most preferably, between about 2400 p.s.i.g. and about 2900 p.s.i.g. at a temperature, preferably, between about 240° F. and about 450° F. and, most preferably, between about 340° F. and about 400° F.

In an improved embodiment of the present process, a first portion of fresh carbon dioxide introduced in line 10 is introduced to urea reactor 20 in line 11, and a second portion is diverted in line 16 to carbamate absorber 30. In this manner, a portion of the carbamate reaction is conducted in carbamate absorber 30 and a second portion of the reaction takes place in urea reactor 20, preferably, evolving sufficient heat to maintain urea reaction temperature therein. In this improvement, energy is conserved in the process heat requirement as well as in the feed compression requirement.

A reaction occurs in urea reactor 20 under the conditions of elevated temperature and pressure as hereinbefore described to produce a mixture comprising urea, water, and ammonium carbamate. The mixture is withdrawn substantially in the liquid phase in line 22, vaporized by expansion in valve 23 and by indirect heat exchange in vaporizer 25, and introduced to gas-liquid separator 27 in line 26.

A gaseous mixture and a liquid mixture are separated in gas-liquid separator 27, the gaseous mixture comprising ammonia, carbon dioxide, and some water, and the liquid mixture comprising urea, water, and ammonium carbamate not decomposed by the expansion and vaporization. The gaseous mixture is introduced as recycle to absorber 30. The liquid mixture is withdrawn in line 29 to further processing to recover urea and, preferably, to recover ammonia and carbon dioxide values contained in the mixture. Preferably, the ammonia and carbon dioxide values are reclaimed at least partially from the aqueous urea mixture by the method illustrated in the drawing, which includes treatment in a second ammonium carbamate absorber 70.

For passage to absorber 70, the mixture contained in line 29 is passed through pressure reduction valve 41 and vaporizer 42 whereby all but a small quantity of the remaining carbamate is decomposed under a decreased pressure and increased temperature. The effluent from vaporizer 42 is introduced in line 44 to gas-liquid separator 46 wherein aqueous urea is separated in line 48 from a gaseous mixture of ammonia, carbon dioxide, and water in line 52.

The aqueous urea withdrawn in line 48 is passed to urea recovery zone 60 wherein urea is recovered, usually by concentration and the production of solid-form urea by means of crystallization, prilling, or granulation. Urea product is withdrawn in line 62, as shown.

The aforementioned gaseous mixture in line 52 is introduced to a second ammonium carbamate absorber 70 wherein ammonia and carbon dioxide are condensed in the presence of water to produce a solution of ammonium carbamate. In the process shown in the drawing, the additional water required to maintain ammonium carbamate in the liquid phase in the low pressure zone of the process is introduced to an upper portion of the second ammonium carbamate absorber 70 in line 72. As an alternate method of providing the water required in absorber 30, water is introduced directly to absorber 30 or to any other suitable place in the process such that the water ratio is maintained. Residual gas is withdrawn from the process to waste in line 74.

The second ammonium carbamate absorber 70 is maintained under a low pressure, preferably, between about 0 p.s.i.g. and about 30 p.s.i.g. and, most preferably, between about 0 p.s.i.g. and about 15 p.s.i.g. at a temperature, preferably, between about 190° F. and about 310° F. and, most preferably between about 200° F. and about 300° F. by coolant circulated in coil 71 or other suitable heat exchange means. The ammonium carbamate mixture produced in absorber 70 is preferably recycled to absorber 30 by withdrawing the mixture in line 76, pressurizing it by means of pump 78 and introducing it to absorber 30 in line 32, as previously mentioned.

In respect to the construction of the carbamate absorber or absorbers employed in the present invention, it should be noted that absorbers or absorber-condensers employed in the past in conjunction with the operation of urea processes using carbamate recycle are employed in the present invention after being modified to handle flow rates used in this process. Such equipment forms no part of subject invention.

Reference is now had to specific examples of the operation of the present invention which should not be construed as unduly limiting the scope thereof.

EXAMPLE 1

In Examples 1 and 2, the entire fresh feed to the synthesis is introduced to the low pressure end of the process.

Accordingly, in Example 1, the fresh feed described below is introduced to an absorption bath of ammonium carbamate liquid maintained at a pressure of 390 p.s.i.a. and a temperature of about 210° F. by cooling water circulated through the bath in a coil. The fresh feed comprising about 2320 pounds-per-hour of 98 percent carbon dioxide, about 1840 pounds-per-hour of substantially pure ammonia, and about 490 pounds-per-hour of water. In addition to the abovementioned quantity of materials, the following mixture separated from a urea reactor effluent is also introduced to above the carbamate adsorption bath, the mixture comprising 4110 pounds-per-hour ammonia, 2080 pounds-per-hour carbon dioxide, 1310 pounds-per-hour of water. These materials are absorbed in the bath under the aforementioned conditions. The effluent from the carbamate absorber is a liquid mixture which comprises 5950 pounds-per-hour ammonia, 4400 pounds-per-hour carbon dioxide, and 1800 pounds-per-hour water in the form of ammonium carbamate. The carbamate mixture is brought to urea reaction pressure by means of a liquid carbamate pump. The urea reaction is carried out at 360° F. and 2550 p.s.i.g. A liquid effluent is withdrawn from the urea reactor comprising 4180 pounds-per-hour ammonia, 2120 pounds-per-hour carbon dioxide, 2740 pounds-per-hour water, and 3120 pounds-per-hour urea. The effluent from the urea reactor is separated into a gaseous effluent, recycled as mentioned above, and a liquid product solution comprising about 3120 pounds-per-hour urea, 1430 pounds-per-hour water, 70 pounds-per-hour ammonia, and 40 pounds-per-hour carbon dioxide.

EXAMPLE 2

Example 2 is carried out in substantially the same manner as Example 1, but differs in the ratio of ammonia to carbon dioxide, and in the ratio of water to carbon dioxide.

Accordingly, the fresh feed to the carbamate bath comprises about 1870 pounds-per-hour ammonia, 2380 pounds-per-hour carbon dioxide, and 510 pounds-per-hour water. Recycled gas separated from the urea reactor effluent, which is also introduced to the carbamate bath comprises 4930 pounds-per-hour ammonia, 2020 pounds-per-hour carbon dioxide, and 1650 pounds-per-hour water. The carbamate bath is maintained at a temperature of about 190° F. and a pressure of about 370 p.s.i.a. by the same method as in Example 1. Under these conditions, a liquid feed mixture of ammonium carbamate is withdrawn to the urea reactor comprising 6800 pounds-per-hour ammonia, 4400 pounds-per-hour carbon dioxide, and 2160 pounds-per-hour water. The urea reaction is carried out at the same temperature and pressure as in Example 1, namely, 360° F. and 2550 p.s.i.g. The reactor effluent is separated into the above-mentioned gaseous mixture recycled to the carbamate absorber and a liquid mixture comprising 3180 pounds-per-hour urea, 1460 pounds-per-hour water, 40 pounds-per-hour carbon dioxide, and 70 pounds-per-hour ammonia.

EXAMPLE 3

Example 3 is described with reference to the drawing. Accordingly, ammonium carbamate absorber 30 is maintained, in this example, under a pressure of about 300 p.s.i.g. and a temperature of about 180° F. A water to carbon dioxide mol ratio is maintained at about 1.4:1.0 in the absorber mainly by the introduction of a solution in line 32, the composition of which solution is about 575 pounds-per-hour ammonia, 332 pounds-per-hour carbon dioxide, and 575 pounds-per-hour water. Fresh carbon dioxide is introduced to absorber 30 at the rate of 745 pounds-per-hour in line 16, this being about 50 percent of the fresh carbon dioxide feed introduced to the synthesis. A gaseous mixture comprising 2085 pounds-per-hour ammonia, 660 pounds-per-hour carbon dioxide, and 440 pounds-per-hour water is also introduced to absorber 30 in line 28 as recycle. A mixture comprising liquid ammonium carbamate and having the composition stated below is withdrawn in line 34, 2660 pounds-per-hour ammonia, 1737 pounds-per-hour carbon dioxide, and 1015 pounds-per-hour water. The mixture in line 34 is pressurized to 2600 p.s.i.g. in pump 36, heated to 325° F. in heater 38, and introduced by means of line 40 to urea reactor 20.

Urea reactor 20 is maintained at a temperature of about 350° F. by the introduction of about 745 pounds-per-hour fresh carbon dioxide feed in line 11. An ammonia to carbon dioxide ratio of about 4:1 is maintained in reactor 20 by the introduction of 1175 pounds-per-hour ammonia in line 21. The effluent withdrawn from reactor 20 in line 22 contains about 2000 pounds-per-hour urea in a 27.2 percent by weight solution.

EXAMPLE 4

A gaseous mixture withdrawn from a process producing melamine from urea at an elevated temperature and pressure is employed as a feed gas to a urea synthesis. In this example, the composition of the feed gas is as follows: 85.8 tons-per-day carbon dioxide, 67.0 tons-per-day ammonia, and 12.0 tons-per-day water. The feed gas which enters at about 75 p.s.i.g. is totally condensed and absorbed in a carbamate absorption zone at about 75 p.s.i.g. and 180° F., about 52.7 tons-per-day of fresh water being supplied to the absorption zone. Liquid mixture is then pressurized by means of a liquid pump to urea reaction pressure heated to 390° F. and introduced to a urea reactor maintained under a pressure of 2550 p.s.i.g. at a temperature of about 360° F. About 28 tons-per-day of urea is withdrawn in the urea reactor effluent.

Having thus described the invention, it is to be understood that many modifications and alterations of the present invention will become apparent to those skilled in the art without departing from the scope of the present invention. For example, the present invention can be operated continuously, or batch-wise, and also on a once-through, partial recycle, or total recycle basis employed to conserve ammonia values.

What is claimed is:

1. A urea synthesis process which comprises: introducing fresh feed comprising ammonia and carbon dioxide to a first confined zone maintained under conditions including a pressure substantially below the pressure of a second zone hereinafter referenced; reacting the carbon dioxide with ammonia in the presence of water in a water to carbon dioxide mole ratio of at least 0.1:1 under exothermic reaction conditions to produce an ammonium carbamate solution; pumping said solution to an elevated pressure and then subjecting said pressurized solution to said elevated pressure maintained in a second confined zone to produce a mixture comprising urea and water under endothermic reaction conditions.

2. The process of claim 1 wherein the pressure is maintained in said first confined zone between about 0 p.s.i.g. and about 1000 p.s.i.g. and a pressure is maintained in said second confined zone between about 1700 p.s.i.g. and about 3500 p.s.i.g.

3. The process of claim 1 wherein said ammonia and carbon dioxide are reacted in the presence of water and the mol ratio of water to carbon dioxide during reaction is maintained between about 0.5:1 and about 1.8:1.

4. The process of claim 1 wherein said first confined zone is maintained under a pressure between about 150 p.s.i.g. and about 350 p.s.i.g. at a temperature between about 160° F. and about 220° F.

5. The process of claim 1 wherein a ratio of ammonia to carbon dioxide is maintained in said first confined zone, preferably, between about 4:1 and about 6:1.

6. The process of claim 1 wherein the reaction in said first confined zone is carried out under a pressure between about 0 p.s.i.g. and about 1000 p.s.i.g. at a temperature between about 60° F. and about 300° F.

7. The process of claim 1 wherein said fresh feed introduced into the first confined zone includes a waste gas mixture containing ammonia and carbon dioxide which mixture cannot be compressed without condensation.

8. A urea synthesis process which comprises: introducing ammonia and substantially all of the fresh carbon dioxide feed to a first confined zone maintained under conditions including a pressure substantially below the pressure of a second confined zone hereinafter referenced; maintaining sufficient ammonia in the first confined zone to condense substantially all of the carbon dioxide to ammonium carbamate; reacting the carbon dioxide and ammonia in the presence of water in a water to carbon dioxide mole ratio of at least 0.1:1 under exothermic reaction conditions; pumping substantially all of the reactants in liquid form to the elevated pressure employed in the second confined zone; and then subjecting said pressurized solution to a higher temperature in said second confined zone to produce a mixture comprising urea and water under endothermic reaction conditions.

9. A urea synthesis process which comprises: introducing ammonia and fresh carbon dioxide feed to a first confined zone maintained under conditions including a pressure substantially below the pressure of a second confined zone hereinafter referenced; reacting the carbon dioxide with ammonia in the presence of water in a water to carbon dioxide mole ratio of at least 0.1:1 to provide a liquid carbamate solution to be supplied to the second zone; pumping substantially all of the reactants supplied to the second confined zone in the liquid form to the elevated pressure employed in the second confined zone and then subjecting the pressurized solution to the pressure and temperature conditions maintained in said second confined zone to produce an effluent mixture comprising urea and water; reducing the pressure on the effluent mixture to separate liquid urea from a gaseous mixture containing ammonia and carbon dioxide; passing said gaseous mixture to a third confined zone and condensing said gaseous mixture in the presence of water and passing said condensate to said first confined zone.

References Cited

UNITED STATES PATENTS

| | | | |
|---|---|---|---|
| 1,344,673 | 6/1920 | Bosch | 260—555 |
| 1,923,489 | 8/1933 | Krase | 260—555 |
| 3,024,280 | 3/1962 | Brown | 260—555 |
| 3,105,093 | 9/1963 | Rothkrans | 260—555 |
| 2,777,877 | 1/1957 | Fauser | 260—555 |

FOREIGN PATENTS 1,224,560   6/1960   France.

OTHER REFERENCES

Cline: "Manufacture of Urea: A Literature Survey," Report No. 646, Tennessee Valley Authority, Wilson Dam, Ala. Copy No. 12, Mar. 6, 1957, pp. 8–12, 40 and 50.

LEON ZITVER, Primary Examiner

M. W. GLYNN, Assistant Examiner

U.S. Cl. X.R.

260—249.7